(12) United States Patent
Hedrick et al.

(10) Patent No.: US 10,690,045 B2
(45) Date of Patent: Jun. 23, 2020

(54) INTAKE AIR BOOST SYSTEM FOR TWO-CYCLE ENGINE HAVING ROOTS BLOWERS

(71) Applicant: Southwest Research Institute, San Antonio, TX (US)

(72) Inventors: John C. Hedrick, Boerne, TX (US); Steven G. Fritz, La Vernia, TX (US); Randy R. McDonnell, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 15/449,972

(22) Filed: Mar. 5, 2017

(65) Prior Publication Data
US 2018/0252153 A1 Sep. 6, 2018

(51) Int. Cl.
| | |
|---|---|
| *F02B 39/04* | (2006.01) |
| *F02B 33/38* | (2006.01) |
| *F02B 33/40* | (2006.01) |
| *F02D 41/00* | (2006.01) |
| *F02D 41/14* | (2006.01) |
| *F04C 18/12* | (2006.01) |
| *F04C 29/00* | (2006.01) |
| *F02D 43/00* | (2006.01) |
| *F04C 28/08* | (2006.01) |
| *F02B 75/02* | (2006.01) |
| *F02B 75/18* | (2006.01) |

(52) U.S. Cl.
CPC ............. *F02B 39/04* (2013.01); *F02B 33/38* (2013.01); *F02B 33/40* (2013.01); *F02D 41/0007* (2013.01); *F02D 41/1454* (2013.01); *F02D 43/00* (2013.01); *F04C 18/126* (2013.01); *F04C 28/08* (2013.01); *F04C 29/005* (2013.01); *F02B 2075/025* (2013.01); *F02B 2075/1832* (2013.01); *F02B 2075/1848* (2013.01); *F02B 2075/1864* (2013.01); *F02B 2075/1868* (2013.01); *F02D 2200/703* (2013.01); *F02D 2400/04* (2013.01)

(58) Field of Classification Search
CPC .......... F02B 33/36; F02B 33/38; F02B 33/40; F02B 33/39; F02B 33/04; F02B 33/06; F02B 75/02; F02B 75/18; F02B 2075/025; F02B 2075/1864; F02D 23/005; F02D 25/028; F02D 41/0007; F04C 29/005
See application file for complete search history.

(56) References Cited

U.S. PATENT DOCUMENTS

| | | | | | |
|---|---|---|---|---|---|
| 3,184,913 | A | * | 5/1965 | Anderson | F16H 47/02 475/75 |
| 3,349,759 | A | * | 10/1967 | De Castelet | F02B 33/00 123/561 |
| 3,498,057 | A | * | 3/1970 | Kronogard | F02C 7/36 180/301 |

(Continued)

*Primary Examiner* — John M Zaleskas
(74) *Attorney, Agent, or Firm* — Livingston Law Firm

(57) ABSTRACT

An air boost system for a two-cycle engine, such as an EMD engine, which operates with one or more roots blowers, or for similar engines that use gear-driven roots blowers or centrifugal blowers. At least one of the roots blowers is equipped with a variable transmission, which allows airflow into the engine to be varied in accordance with load or other engine operating conditions.

16 Claims, 5 Drawing Sheets

(56) References Cited

U.S. PATENT DOCUMENTS

| | | | | |
|---|---|---|---|---|
| 3,595,013 A * | 7/1971 | Brille | F02B 27/04 | 123/561 |
| 3,665,787 A * | 5/1972 | Wilkinson | F02B 33/34 | 123/561 |
| 4,563,997 A * | 1/1986 | Aoki | F02B 33/42 | 123/559.2 |
| 4,671,137 A * | 6/1987 | Di Aragona | F02B 39/08 | 192/61 |
| 4,730,593 A * | 3/1988 | Regar | F02B 33/446 | 123/559.3 |
| 4,875,454 A * | 10/1989 | Okimoto | F02B 33/38 | 123/559.3 |
| 5,335,500 A * | 8/1994 | Wunderlich | F02B 37/04 | 123/561 |
| 5,361,744 A * | 11/1994 | Teraoka | F02B 39/04 | 123/561 |
| 5,394,853 A * | 3/1995 | Teraoka | F02B 33/40 | 123/561 |
| 5,890,468 A * | 4/1999 | Ozawa | F02B 37/005 | 123/561 |
| 6,082,340 A * | 7/2000 | Heimark | F02B 33/40 | 123/559.1 |
| 9,109,502 B1 * | 8/2015 | Hall | F02B 39/10 | |
| 2002/0096156 A1 * | 7/2002 | Palazzolo | F02B 39/04 | 123/559.1 |
| 2006/0263203 A1 * | 11/2006 | Barker | F01P 7/046 | 415/122.1 |
| 2007/0062498 A1 * | 3/2007 | Woods | F02B 33/40 | 123/559.1 |
| 2007/0137626 A1 * | 6/2007 | Turner | F02B 33/34 | 123/559.1 |
| 2010/0031935 A1 * | 2/2010 | VanDyne | F02B 37/105 | 123/559.1 |
| 2010/0037876 A1 * | 2/2010 | Robinson | F01L 1/047 | 123/65 PE |
| 2010/0199666 A1 * | 8/2010 | VanDyne | F02B 37/105 | 60/605.2 |
| 2010/0307465 A1 * | 12/2010 | Haldeman | F02B 39/10 | 123/565 |
| 2011/0239995 A1 * | 10/2011 | Bernard | F02B 33/36 | 123/559.1 |
| 2012/0000446 A1 * | 1/2012 | Venton-Walters | F16D 1/101 | 123/564 |
| 2012/0025542 A1 * | 2/2012 | Schaaf | F16H 15/503 | 290/1 A |
| 2012/0090319 A1 * | 4/2012 | Mond | F02B 37/04 | 60/609 |
| 2014/0182564 A1 * | 7/2014 | Venton-Walters | F02B 33/44 | 123/564 |
| 2014/0260244 A1 * | 9/2014 | Son | F02B 33/40 | 60/609 |
| 2014/0331656 A1 * | 11/2014 | Nagar | F02B 75/28 | 60/297 |
| 2014/0373815 A1 * | 12/2014 | Nagar | F02B 75/28 | 123/51 B |
| 2014/0373816 A1 * | 12/2014 | Nagar | F02D 41/0007 | 123/51 B |
| 2015/0114364 A1 * | 4/2015 | Matsuda | F02B 39/12 | 123/559.1 |
| 2015/0330295 A1 * | 11/2015 | Walls | F16H 3/728 | 475/5 |
| 2015/0377158 A1 * | 12/2015 | Benjey | F02B 39/10 | 701/22 |
| 2016/0001649 A1 * | 1/2016 | Benjey | B60K 6/48 | 477/5 |
| 2016/0076466 A1 * | 3/2016 | Moore | F02D 41/0007 | 60/273 |
| 2017/0044948 A1 * | 2/2017 | Caine | F02D 41/0255 | |
| 2017/0201156 A1 * | 7/2017 | Han | F16H 57/021 | |
| 2017/0201169 A1 * | 7/2017 | Han | F16D 27/01 | |

* cited by examiner

|  | BSFC | BSHC | BSCO | BSNO$_X$ | BSPM |
|---|---|---|---|---|---|
| NOTCHES IDLE, DB4, N1, N2, AND N3 | 0.3% | -14.5% | 25.1% | -17.8% | 494.4% |
| NOTCHES IDLE, DB4, N1, AND N2 | -1.1% | -13.8% | 4.9% | -11.2% | 31.6% |
| NOTCHES IDLE, DB4, AND N1 | -1.6% | -12.4% | -6.3% | -6.6% | 12.2% |

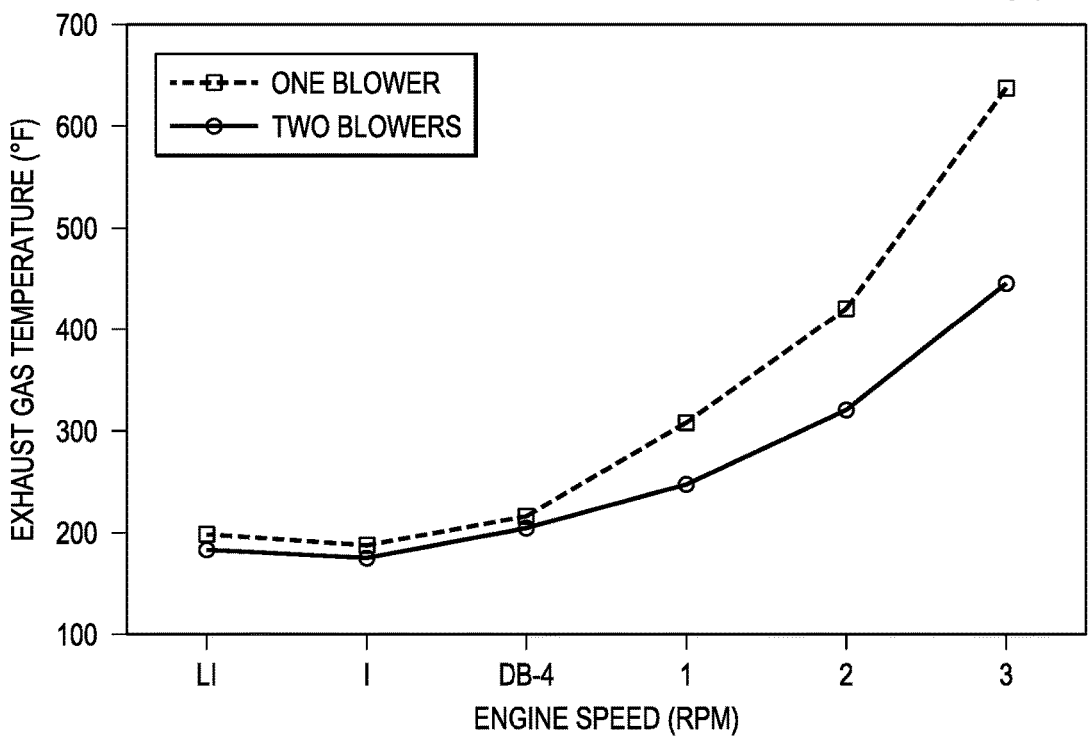
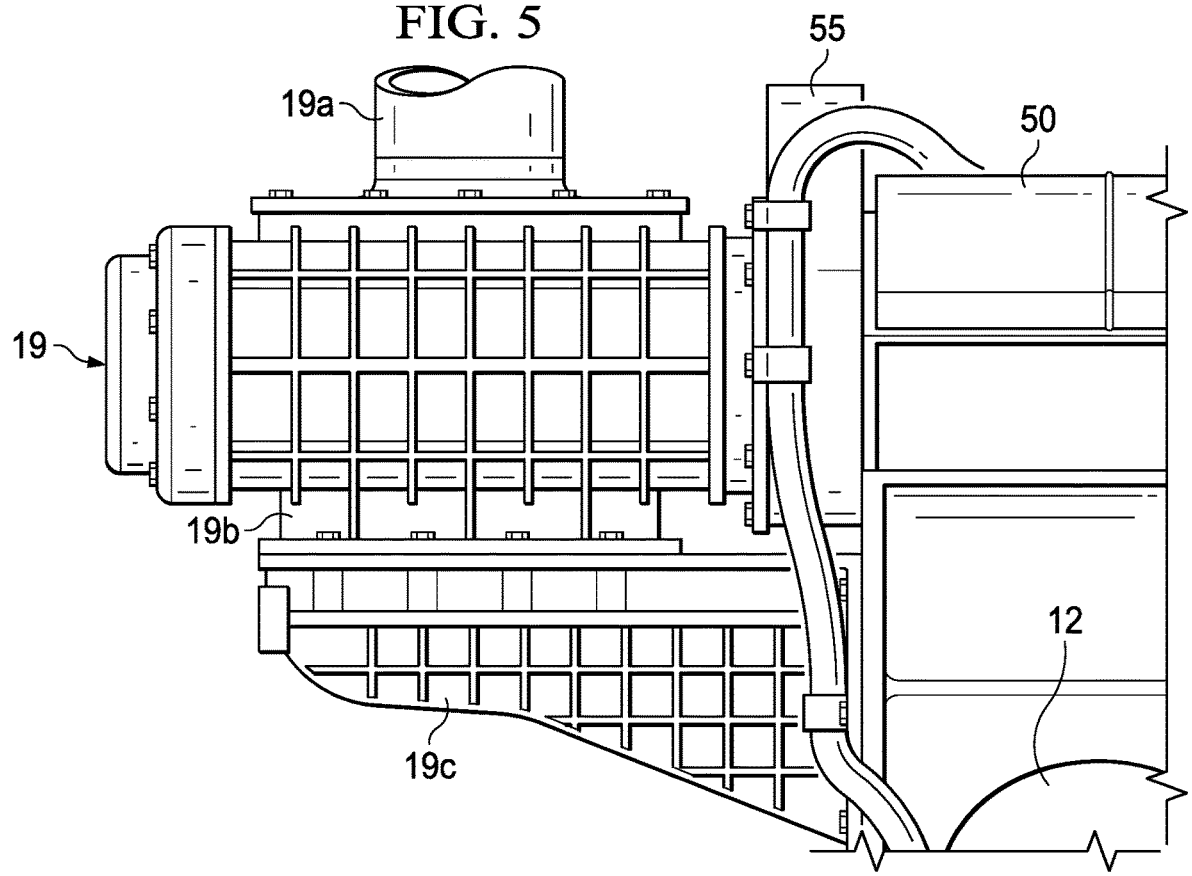

INTAKE AIR BOOST SYSTEM FOR TWO-CYCLE ENGINE HAVING ROOTS BLOWERS

TECHNICAL FIELD OF THE INVENTION

This invention relates to two-cycle engines, and more particularly to an improved air boost system for a two-cycle engine equipped with one or more roots blowers.

BACKGROUND OF THE INVENTION

The EMD engine, manufactured by Electro-Motive Diesel, is a two-stroke medium-speed diesel engine, used in locomotive, marine, and stationary power applications. The engine is made in V-8, V-12, V-16, and V-20 configurations. Most current locomotive production is the V-12 and V-16 version of the engine, whereas many of the marine and stationary engines are V-20 versions.

In addition to being a two-stroke diesel engine, the EMD engine is a uniflow scavenged engine. The engine requires an external air pump to provide enough differential air pressure across the cylinder to allow the engine to be scavenged effectively.

For an EMD engine, two different air pump systems have been used. A "naturally aspirated" engine has one or more gear-driven roots-type blowers. These engines are typically used for low power applications. A "turbo-supercharger" engine has a gear-driven turbocharger that provides the required air flow at idle and light-to moderate loads. At higher loads, once the exhaust energy is high enough to sustain the turbocharger, an overriding clutch releases and the turbocharger "comes off the gear" maximizing engine efficiency.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates the exhaust gas temperature of the engine of FIG. 1, with and without one roots blower disabled, at varying engine speeds and loads.

FIG. 5 illustrates a roots blower mounted on an engine, with a gear box between the rear of the engine and the blower.

DETAILED DESCRIPTION OF THE INVENTION

The following description is directed to two-cycle engines, such as the EMD engines described in the Background, and in particular, those that use one or more roots blowers. Although this description is written in terms of an EMD engine, the same concepts could apply to other similar engines, that is, two-cycle engines having a mechanically driven roots blower or centrifugal blower as its air pump system. Such other engines include, but are not limited to, Fairbanks-Morse, Detroit Diesel, and MAN diesel engines. This type of engine is referred to herein as a "roots-blown two-cycle engine".

The invention is directed to the recognition that conventional roots-blown two-cycle engines may have limitations when operated at less than rated power. At less than rated power, the conventional roots-blown air system results in arguably undesirable high AFRs (air-to-fuel ratios). Also, a limitation particularly true for locomotive applications is that a potential exists for insufficient air supplied to the engine at rated power.

Although this description is in terms of a locomotive engine, the same concepts apply to marine as well as stationary engines, such as those used for electrical power generation. Furthermore, engines similar to EMD engines with roots blowers or centrifugal blowers, can be expected to have similar limitations.

Figure 1:
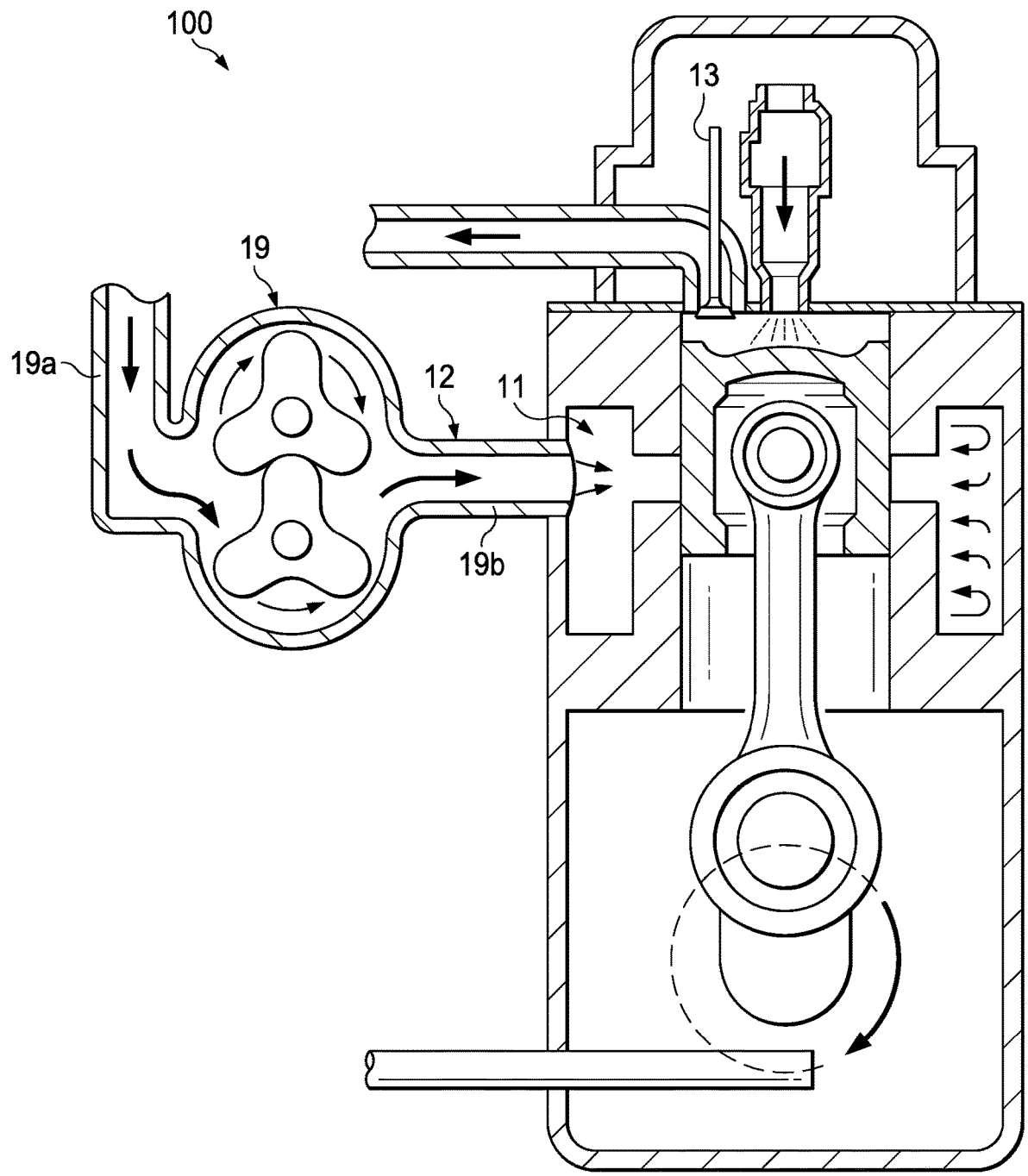
FIG. 1 is a representative drawing of a conventional uni-flow two-cycle diesel engine, showing a single cylinder served by a roots blower.

FIG. 1 is a representative drawing of a conventional roots-blown two-cycle diesel engine. The engine is represented with a single cylinder 100, with the understanding that a production engine has numerous cylinders, as well as various associated electrical and mechanical elements typically associated with a uni-flow two-cycle diesel engine system. In other words, only those parts of the engine relevant to the invention are shown.

For purposes of example herein, the engine is a sixteen cylinder EMD engine, commercially available as the EMD 16-645E engine. As stated above, the invention described herein may be useful with other two-stroke diesel engines that have roots blower(s) or centrifugal blower(s).

Cylinder 100 has multiple intake ports 11, which receive intake air via an air box (intake manifold) 12. Exhaust port 13 expels exhaust, via exhaust valves, to an exhaust manifold (not shown). Both the air box 12 and the exhaust manifold serve additional cylinders of the engine.

A roots blower 19 provides an air pressure differential across the cylinder 100 to allow scavenging, which is the process of pushing out exhaust gases while refilling the cylinder with fresh air, when the piston uncovers the intake ports in the cylinder liner and the exhaust valves are open. A conventional sixteen-cylinder EMD 645E engine has two such roots blowers 19. In a conventional EMD 645E engine, both roots blowers 19 operate at the same time during engine operation at all loads at a speed proportional to engine speed. Engines with fewer cylinders, such as an eight-cylinder engine, may use only one roots blower. On an EMD 645E engine, the roots blowers 19 are mounted on the rear end of the engine.

Blower 19 has an inlet 19a that receives air from the atmosphere via an intake filter (not shown). A blower outlet 19b delivers pressurized air to the engine air box (manifold) 12. Air is forced into the cylinders via the pressurized air box 12, which extends the length of the engine. Fuel is supplied by fuel injection in a known manner.

For locomotive applications, the throttle system of the EMD 645E engine is designed with a number of steps, referred to as "notches". Position 1 (Notch 1) is the lowest powered setting where current is delivered to the traction motors. Position 8 (Notch 8) is maximum engine speed and the position where maximum horsepower is available.

As indicated above, a problem with using both of the two roots blowers 19, is a high AFR at idle and light loads. The combination of the two roots blowers 19 is designed to provide sufficient air at rated (high load) power conditions. However, at most other operating conditions, especially at idle and light loads, the roots blowers 19 provide more than enough air for combustion, and arguably provide excess air. For example, the engine will typically have an idle AFR greater than 350:1. In a locomotive application, at Notch 2, which is a light load, the engine will have an AFR of approximately 156:1. These high AFR's at idle and light loads result in relatively low exhaust temperatures, as well as relatively high fuel consumption due to the high parasitic losses of pumping excess air.

Experimentation has been performed on an EMD 16-645E engine, eliminating one of the roots blowers at various light load conditions. Tests show a significant reduction to NOx, a reduction to cycle weighted specific fuel consumption over the US-EPA switcher test cycle, and higher exhaust temperatures.

Figures 2, 3:
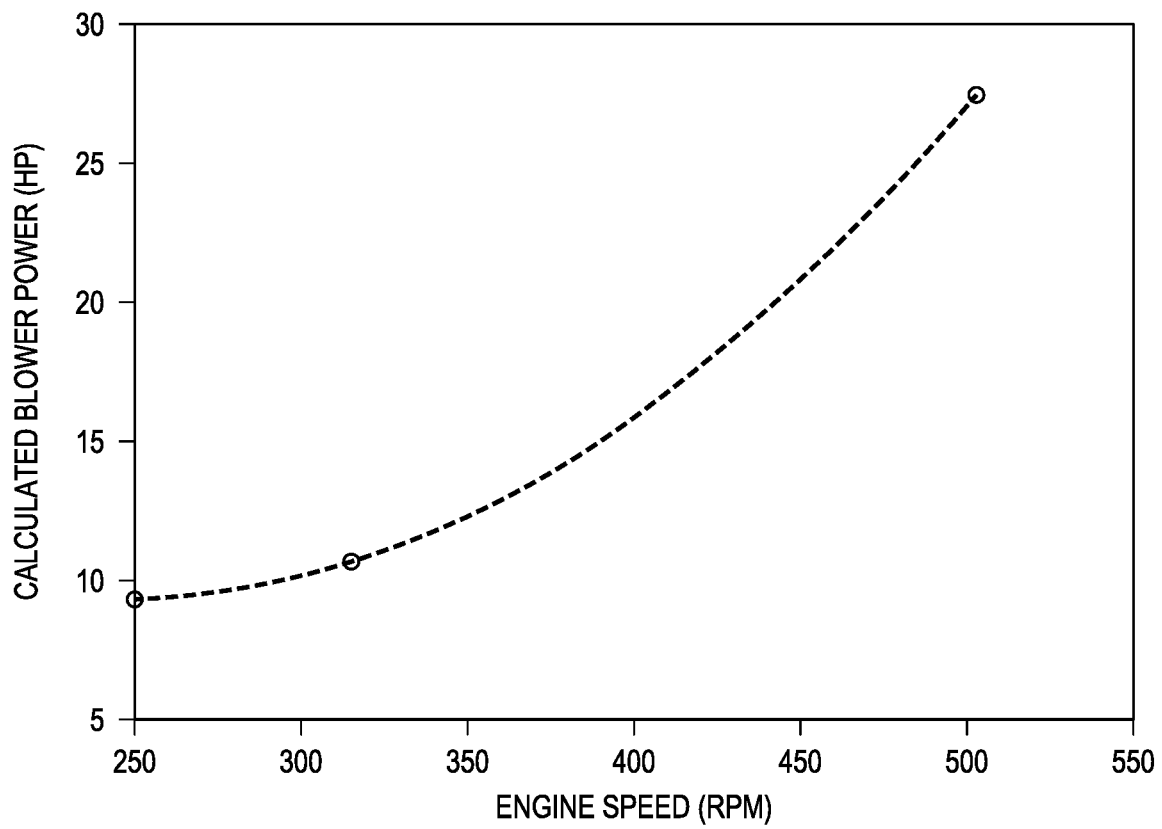
FIG. 2 illustrates the calculated power consumption of a roots blower such as that of FIG. 1, at varying engine speeds.
FIG. 3 illustrates the percent differences in various engine performance metrics of the engine of FIG. 1 with one of the engine's two blowers disabled at various low loads.

FIG. 2 illustrates an estimated blower power consumption of 9.4 HP (7 kW) at idle and 27.5 HP (20.5 kW) at Notch 3 for each of the two roots blowers 19 of the engine of FIG. 1. This is energy wasted if the roots blower is not needed to provide adequate combustion and scavenging air at idle and light loads. This wasted energy unnecessarily increases the brake specific fuel consumption and exhaust emissions.

FIG. 3 illustrates experimental results of disabling one of the two roots blowers 19 at various notches, specifically at various combinations of Idle, Dynamic Brake 4, Notch 1, Notch 2, and Notch 3 (all referred to herein as "low loads"). Operating the engine with two roots blowers, and then only one, over the US-EPA switcher cycle, various engine performance metrics were measured and compared. These engine performance metrics include BSFC (brake specific fuel consumption), BSHC (brake specific hydrocarbon emissions), BSCO (brake specific carbon monoxide emissions), BSNOx (brake specific NOx emissions), and BSPM (brake specific particulate matter).

The percent differences for one blower versus two blowers in operation are shown. Operating the engine with only one roots blower at Idle, Dynamic Brake 4, Notch 1, and Notch 2 results in a 1.1 percent improvement in fuel consumption and an 11.2 percent decrease in NOx over the US-EPA Switcher Cycle.

FIG. 4 illustrates a comparison of exhaust gas temperatures, with one roots blower 19 versus two blowers 19 in operation. Temperatures over various light loads (idle, DB4, and Notches 1, 2 and 3). As illustrated, exhaust temperatures are higher with only one roots blower in operation.

It follows that in an engine such as the engine represented in FIG. 1, it would be highly advantageous to reduce the air being pumped by the roots blowers 19 at low loads. However, the roots blowers must maintain the capability of providing the appropriate amount of combustion air at higher loads.

If the output of the roots blowers is reduced at low engine loads, a first advantage would be to increase the exhaust temperature to facilitate the use of exhaust aftertreatment systems that rely on exhaust temperature to become active (i.e., selective catalytic reduction (SCR), diesel oxidation catalysts (DOC), and the regeneration of diesel particulate filters (DPF)). A second advantage would be a reduction in parasitic load, which translates to reduced fuel consumption and NOx emissions. A third advantage is to reduce the amount of exhaust gas recirculation (EGR), if implemented on the engine if required to further reduce NOx emissions.

Another limitation of roots-blown engines such as that represented in FIG. 1 is operation at high altitudes. Because the engine uses fixed-drive blowers 19, the engine may not have enough air to support complete combustion at high load (Notch 8) at high altitude operation due to the lower air density. This incomplete combustion produces high smoke, particulate matter, and carbon monoxide emissions. It could be advantageous to overdrive the blowers up to the maximum acceptable speed of the blowers to maintain adequate AFR while operating at high load and high altitude.

FIG. 5 is a perspective view of a roots blower 19 installed on an EMD engine 50. Only a rear portion of engine 50 is shown, but the engine 50 is assumed to have sixteen cylinders, in a Vee configuration, each like that described above in connection with FIG. 1. The sixteen-cylinder engine would have two roots blowers, with the second roots blower not visible in the view of FIG. 5.

As described above, the roots blower 19 has an output portion 19*b*. In the configuration of FIG. 5, the output portion 19*b* delivers pressurized air to air box 12 via a lower housing 19*c* of the roots blower 19.

A rear gear box 55 is located between the engine 50 and the roots blower 19. This gear box 55 contains the gear mechanisms for driving the roots blower 19.

A feature of the engine system of FIG. 5 is the addition of a variable transmission within gear box 55 to drive the roots blower 19. A continuously variable transmission is particularly suitable. A continuously variable transmission is an automatic transmission that can change through a continuous range of effective gear ratios. Continuously variable transmissions include "infinitely variable transmissions", which give a zero-output speed within the operating range.

Although, this description is in terms of a "variable transmission", any device that can be controlled to adjust the output of roots blower 19 can be used. For example, a variable displacement hydraulic pump device could be used in a manner equivalent to a variable transmission.

Figure 6:
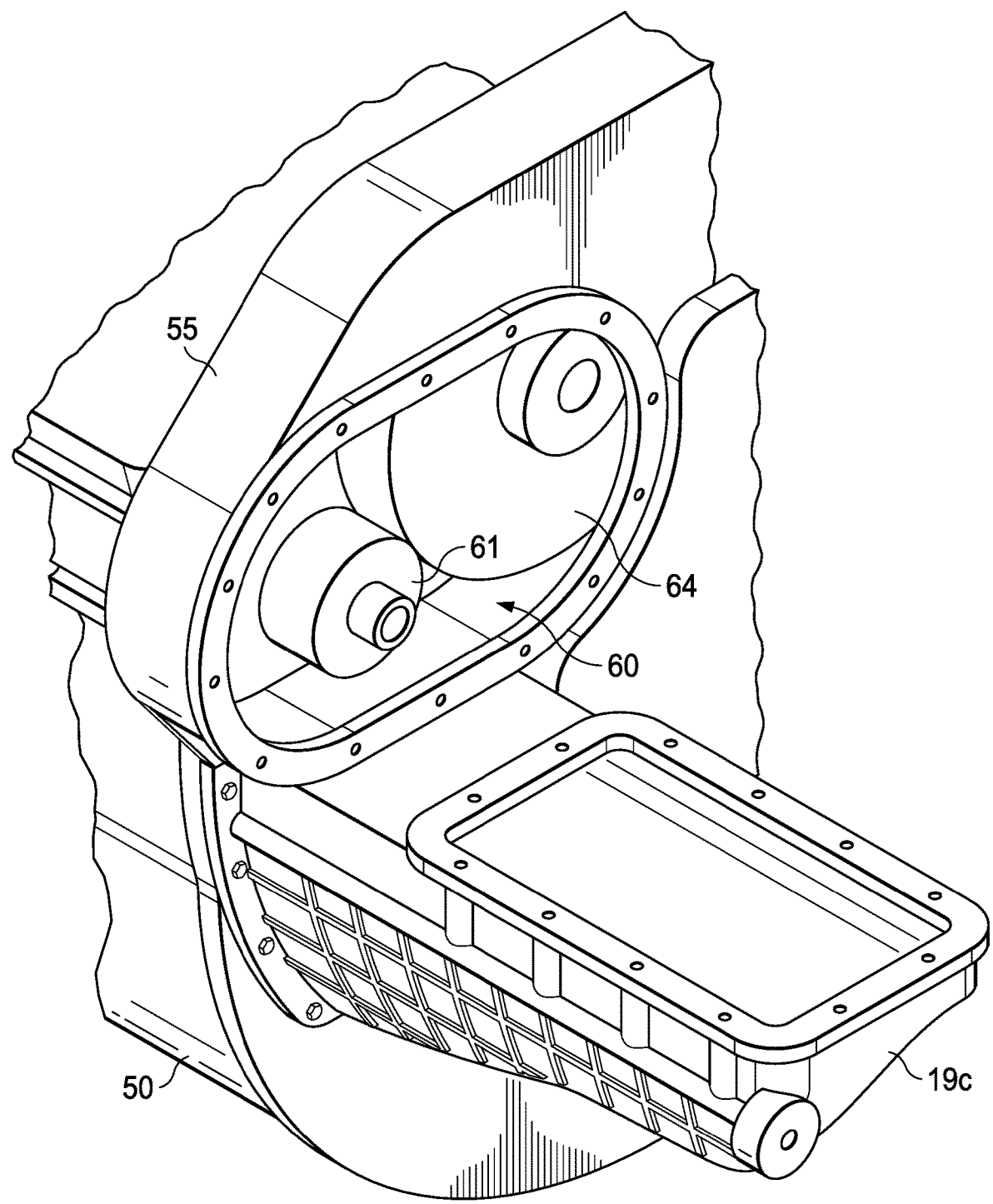
FIG. 6 illustrates an engine system, similar to that of FIG. 5, with the roots blower removed, and showing how a variable transmission may be mounted inside the gear box.

FIG. 6 illustrates the rear of engine 50, with an open gear box 55, exposed because roots blower 19 has been removed. The lower housing 19*c* of roots blower 19 is also shown. Referring to both FIGS. 5 and 6, it can be seen that gear box 55 and lower housing 19*c* each provide an interface for mounting roots blower 19.

FIG. 6 further illustrates installation of a variable transmission 60 within gear box 55. The variable transmission 60 is driven off the large cam gear 64, and may include an input gear 61, which may be the same as or similar to the blower gear of a conventional roots blown engine. The variable transmission 60 replaces the single gear used to drive the roots blower in conventional EMD engines. Like the conventional gear, the variable transmission drives a shaft to operate the blower.

As explained below, engine 50 can be supplied air that is adequate for combustion and cylinder scavenging at idle through Notch 8 with the roots blowers 19 being driven at a desired speed by variable transmission 60. In particular, the variable transmission 60 drives the roots blowers 19 at a desired speed to maintain the scavenging air flow needed to maintain a target AFR over the entire operating range.

For engines having two roots blowers 19, either or both roots blowers may have an associated variable transmission. It may be advantageous to operate the roots blowers with one roots blower having a variable transmission and the other having a conventional fixed gear ratio. Advantages of equipping only one roots blower with a variable transmission include cost reduction, simplified control, and a fail-safe mode if the transmission-driven blower fails. If only one of two roots blowers is equipped with a variable transmission, its operating speed range may be appropriately increased.

The variable transmission controls the output of its associated roots blower to maintain a desired engine operating condition, such as a desired AFR. The output of the roots blowers will vary according to load. In particular, at "low loads" (as defined above), the output of each roots blower 19 may be reduced. Furthermore, in some conditions, such as high altitudes, the variable transmission can be used to drive the roots blowers 19 to a higher output than is conventionally available.

As shown in FIG. 6, for an EMD two-cycle engine, the variable transmission 60 may be conveniently installed in the gear box 55 between the engine 50 and roots blower 19. The engine gear box 55 is approximately six inches deep. In addition, there is additional space in gear box 55 in front of the blower 19 when blower 19 is installed. Thus, with blower 19 installed, there is adequate space within gear box 55 for variable transmission 60.

If more space is needed for variable transmission 60, then blower 19 can be spaced out, away from the engine 50. A spacer can be added to fill any gap between the interfaces of the gear housing 55 and the blower 19. For other two-cycle engines, a variable transmission can be mounted appropriately to connect the engine drive system to the roots blower.

Figure 7:
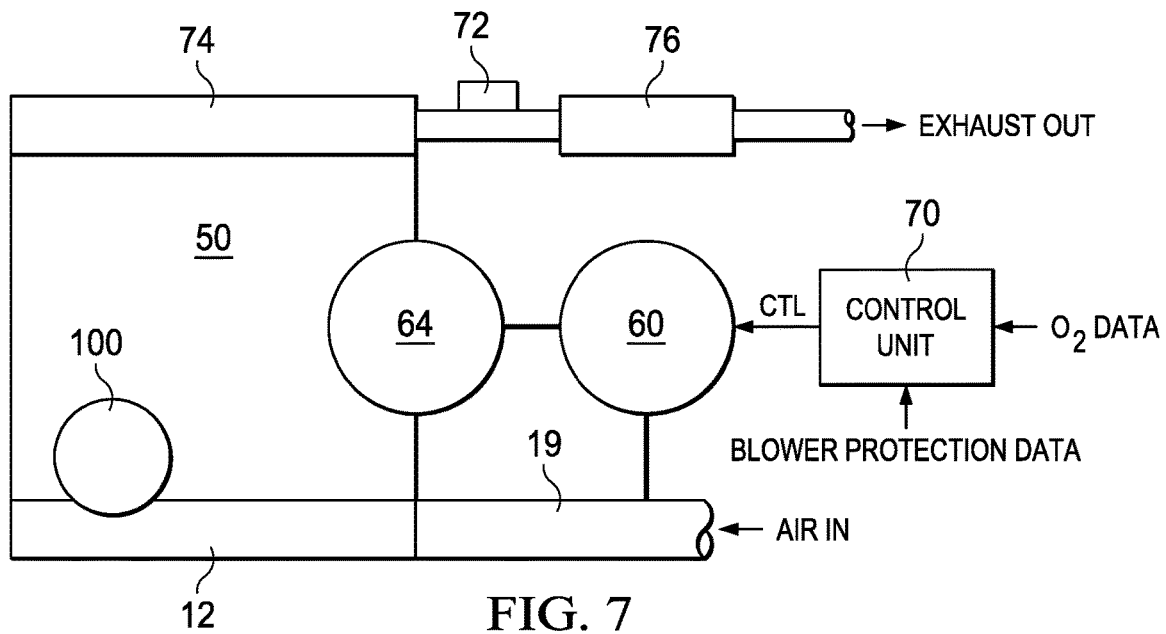
FIG. 7 schematically illustrates the engine system with a variable transmission to drive the roots blower(s).

FIG. 7 schematically illustrates engine 50 equipped with a variable transmission 60 to drive its roots blowers 19. Engine 50 is represented with one cylinder 100 and one roots blower 19, with the understanding that an actual engine has more cylinders and may have more than one roots blower 19.

Referring to both FIGS. 6 and 7, roots blower 19 delivers air to the cylinders via an air box 12. The variable transmission 60 is driven by the engine's camshaft gear 64. Many configurations for variable transmissions are available; some may use various gear systems, with pulleys or chains to drive them.

As an example, in one embodiment, the blower is belt-driven and a variable diameter pulley system achieves variable speed ratios. The diameter of each pulley is varied by hydraulic control that moves sheaves axially.

In engines with centrifugal blowers driven off an engine cam gear, the same concepts can be used to replace the blower gear with a variable transmission.

FIG. 7 further illustrates a variable transmission (VT) control unit 70, which is programmed to deliver control signals to variable transmission 60 to control its drive ratio so that roots blower 19 provides a desired output of air flow. Control unit 70 has appropriate hardware, programming and memory to implement the methods described herein. Control unit 70 may be part of a larger comprehensive engine control system.

The input data used to control variable transmission 60 may vary according to the control strategy. In FIG. 7, the control method uses an oxygen sensor 72 in the exhaust system of the engine. In the example of FIG. 7, the oxygen sensor 72 is installed between the exhaust manifold 74 and the exhaust aftertreatment system 76 (if fitted). The control unit 70 adjusts air flow output of blower 19 (by controlling variable transmission 60) to maintain a targeted oxygen level in the exhaust.

FIG. 7 further illustrates optional "blower protection" input data to control unit 70. For conditions, such as high altitudes, where a variable transmission 60 is used to provide boost air above conventional levels, control unit 70 may be programmed to prevent overspeed failure of a variable transmission roots blower 19. Added "blower protection" inputs to control unit 60 may include engine speed and/or transmission ratio or transmission output speed. Alternatively, input from a speed sensor measuring the speed of roots blower 19 may be used. Alternatively, rather than using control unit 70 to avoid overspeed, the variable transmission 60 may be designed with gear ratios that will not allow the roots blower to exceed a predetermined maximum speed.

Approaches other than input from oxygen sensor 72 are possible for using control unit 70 and variable transmission 60 to maintain a target AFR at all operating conditions.

Figure 8:
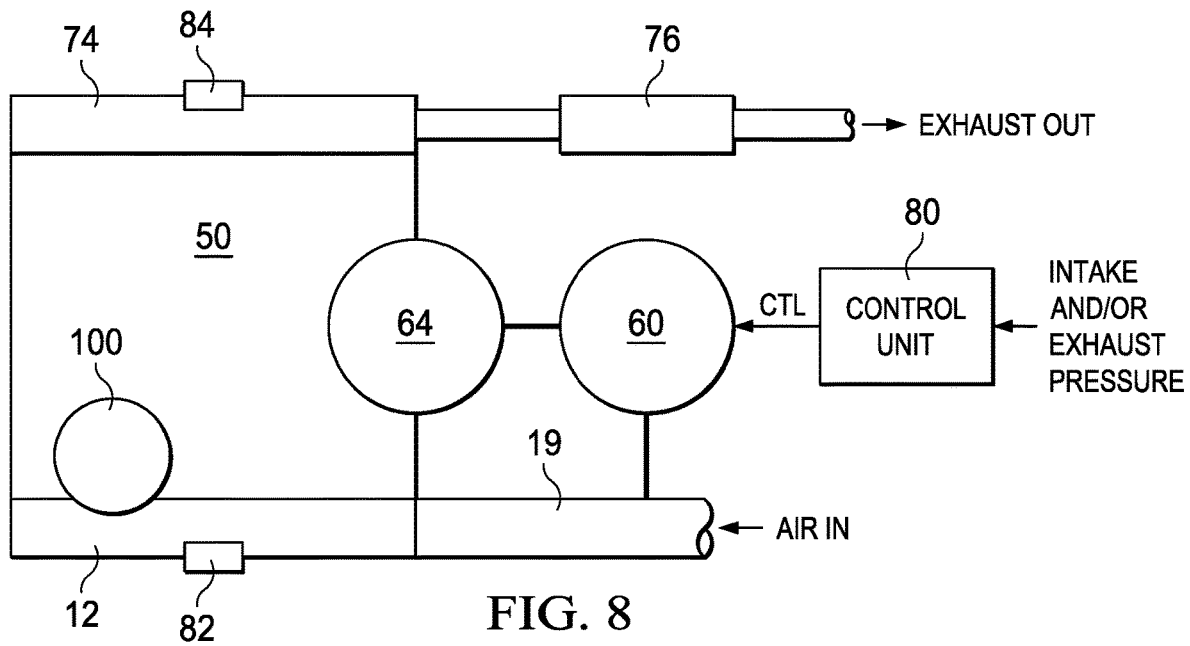
FIG. 8 illustrates the engine system of FIG. 7, with alternative input to the control unit.

FIG. 8 illustrates the engine system of FIG. 7, but with an alternative control method. Measured or estimated input data to control unit 70 may include absolute boost pressure, absolute exhaust pressure, and differential pressure between intake and exhaust. Appropriate pressure sensors (intake manifold pressure sensor 82 and exhaust pressure sensor 84) may be installed. Their output data is delivered to control unit 80, which is appropriately programmed to use the data to control variable transmission 60.

Figure 9:
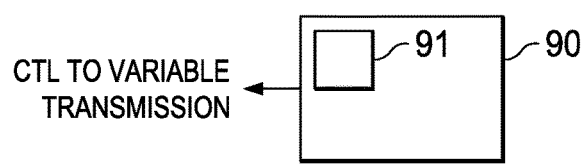
FIG. 9 illustrates how the variable transmission may be controlled by means of stored data in a look-up table.

FIG. 9 illustrates a variable transmission control method that is based on stored data representing a look-up table. The engine system is like that of FIGS. 7 and 8, but with an alternative control unit 90 and different input data. Control unit 90 stores a look up table 91 that maps measured or estimated engine conditions to a desired gear ratio of variable transmission 60. The input engine conditions may include variables such as inlet air density, ambient pressure (altitude/barometer), ambient temperature, notch command, and rack position. When used with engine speed, rack position can be used as a calculated fuel flow value. Other variables can include a target air box absolute pressure (MAP) at each notch, or a target absolute exhaust back pressure at each notch. Various combinations of any or all of these variables may be used for the look-up table 91.

As indicated above, advantages of using variable transmission 60 include the availability of higher exhaust temperatures at light loads, which allows exhaust aftertreatment devices to operate at lower speeds and loads. Fuel consumption at light loads is lowered. Smoke and PM emissions at high loads and high altitudes are lowered. NOx emissions may also be lowered.

What is claimed is:

1. A throttle and air boost system for a scavenged two-cycle engine, the engine having a number of cylinders, an exhaust system, and an intake manifold, comprising:
   a throttle system operable to adjust engine fueling in response to operator-selected notch positions;
   at least one blower operable to deliver pressurized air to the cylinders via the intake manifold, wherein the at least one blower includes at least one roots blower or at least one centrifugal blower;
   wherein the at least one blower provides an airflow output of all combustion air and air necessary for scavenging of the cylinders;
   wherein the at least one blower is the sole supplement to naturally aspirated air intake into the engine, receiving air intake directly from ambient air, and is operable to provide output during all operation of the engine at mid and high notch positions;

wherein the at least one blower is installed between and directly interfaces a gear box and an air box and delivers pressurized air to the air box;

a variable transmission associated with one or more of the at least one blower, operable to drive the one or more of at least one blower to a desired amount of airflow output;

a camshaft gear associated with the variable transmission, operable to drive the variable transmission;

wherein the camshaft gear and the variable transmission are installed within the gear box; and a control unit programmed to to deliver control signals to the variable transmission to adjust the variable transmission such that the airflow output is reduced at all times during low notch positions.

2. The throttle and air boost system of claim 1, wherein the engine is a sixteen-cylinder engine with two blowers.

3. The throttle and air boost system of claim 2, wherein the two blowers are each associated with the variable transmission.

4. The throttle and air boost system of claim 1, wherein the variable transmission is a continuously variable transmission.

5. The throttle and air boost system of claim 1, wherein the variable transmission is an infinitely variable transmission.

6. The throttle and air boost system of claim 1, wherein the engine is a locomotive engine, and the control unit is further programmed to control the variable transmission such that air pressure into the cylinders is increased at high altitudes.

7. The throttle and air boost system of claim 1, wherein the variable transmission is a variable diameter pulley transmission.

8. The throttle and air boost system of claim 1, wherein the control unit has memory for storing data that maps one or more engine conditions to desired outputs of the variable transmission.

9. A method of maintaining target air-fuel ratios of air and fuel combusted by a scavenged two-cycle engine, the engine having a number of cylinders, an intake manifold, and an exhaust system, comprising:

throttling the engine by selecting notch levels;

adjusting fueling of the engine in response to a selected notch level;

providing air to the engine with at least one blower, the at least one blower providing an airflow output of all combustion air and air necessary for scavenging of the cylinders;

wherein the at least one blower is the sole supplement to naturally aspirated air intake into the engine, receiving air intake directly from ambient air, and is operable to provide output during all operation of the engine at mid and high notch positions;

wherein the at least one blower is installed between and directly interfaces a gear box and an air box and delivers pressurized air to the air box;

installing a variable transmission, driven by a camshaft of the engine and operable to drive an associated blower of the at least one blower to a desired amount of airflow output;

and controlling the variable transmission during operation of the engine, such that the at least one blower reduces the airflow output at all times during low notch positions.

10. The method of claim 9, wherein the engine is a sixteen-cylinder engine with two blowers.

11. The method of claim 10, wherein the two blowers are each associated with the variable transmission after the installing step is performed.

12. The method of claim 9, wherein the variable transmission 4-s is a continuously variable transmission.

13. The method of claim 9, wherein the variable transmission is an infinitely variable transmission.

14. The method of claim 9, wherein the engine is a locomotive engine, and further comprising controlling the variable transmission such that air pressure into the cylinders is increased at high altitudes.

15. The method of claim 9, wherein the variable transmission is a variable diameter pulley transmission.

16. The method of claim 9, wherein the engine is equipped with an exhaust system and an oxygen sensor in the exhaust system, and wherein the controlling step is performed using output of the oxygen sensor.

* * * * *